United States Patent [19]
Bobard

[11] 3,908,774

[45] Sept. 30, 1975

[54] COUPLING MEANS FOR TRACTORS

[75] Inventor: Emile Bobard, Beaune, France

[73] Assignee: Bobard Jeune, Beaune (Cote d'Or), France

[22] Filed: June 14, 1974

[21] Appl. No.: 479,586

[30] Foreign Application Priority Data
June 28, 1973  France .................... 73.23697

[52] U.S. Cl. ............. 180/1 F; 180/14 R; 180/53 R; 214/131 A
[51] Int. Cl.² .......................................... B60P 1/64
[58] Field of Search ......... 180/1 F, 14 R; 280/34 R, 280/80 B; 214/131 A, 313, 315; 296/35 A

[56] References Cited
UNITED STATES PATENTS

| | | | |
|---|---|---|---|
| 1,266,828 | 5/1918 | Lane .............................. | 214/313 X |
| 2,565,792 | 8/1951 | Wagner et al. ................ | 214/313 X |
| 2,829,789 | 4/1958 | Gerhardt et al. .............. | 214/315 |
| 2,835,504 | 5/1958 | Acker ............................ | 280/80 B |
| 3,670,912 | 6/1972 | Dunbar ......................... | 214/313 |

FOREIGN PATENTS OR APPLICATIONS
93,069  12/1968  France ................................ 180/1 F

*Primary Examiner*—Kenneth H. Betts

[57] ABSTRACT

An automotive device resulting from coupling together a piece of equipment and a straddle tractor includes coupling means of the transverse-pin and lateral-slot type mounted appropriately on vertically adjustable longitudinal members of the tractor chassis and on the piece of equipment, the tractor including a mechanism for adjusting the distance between its sides while it is in motion. This device is characterized in that its coupling means comprise transverse sliding and guiding arrangements for the slot pins, the latter projecting laterally to a substantially degree into the straddle chassis. The device makes it possible to obtain a series of self-propelling machines from a single straddle tractor.

8 Claims, 8 Drawing Figures

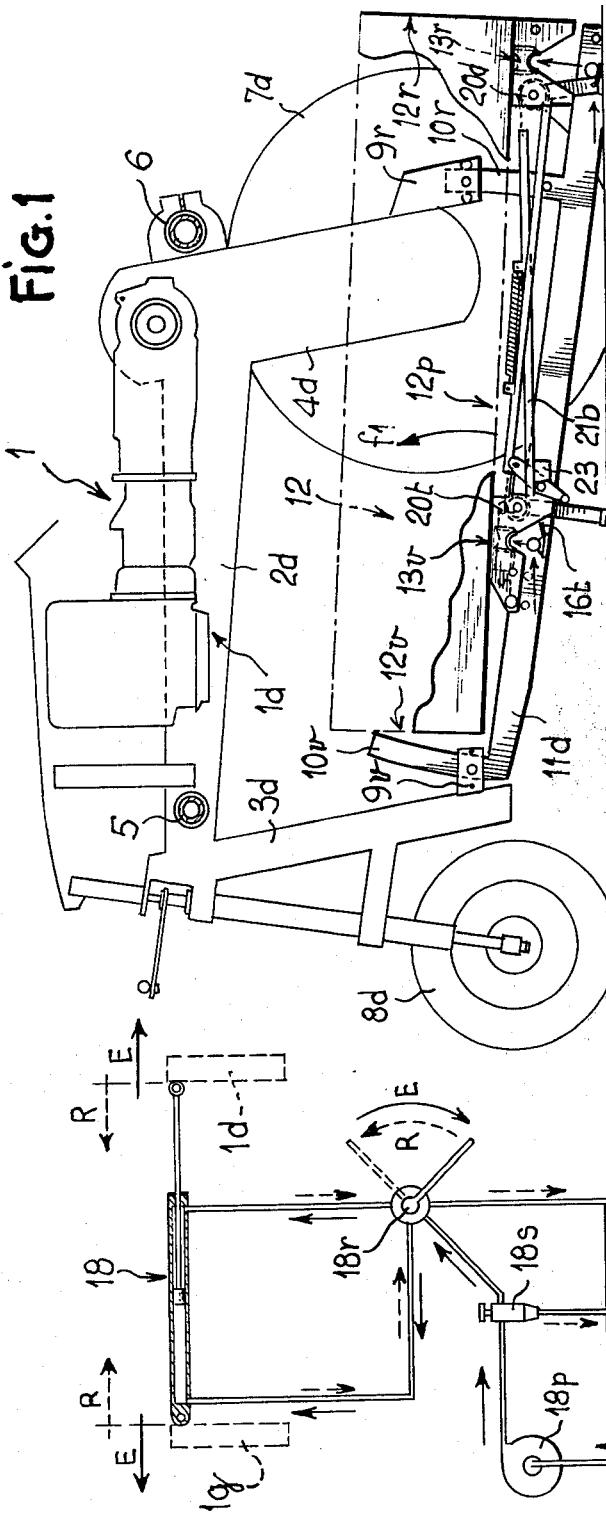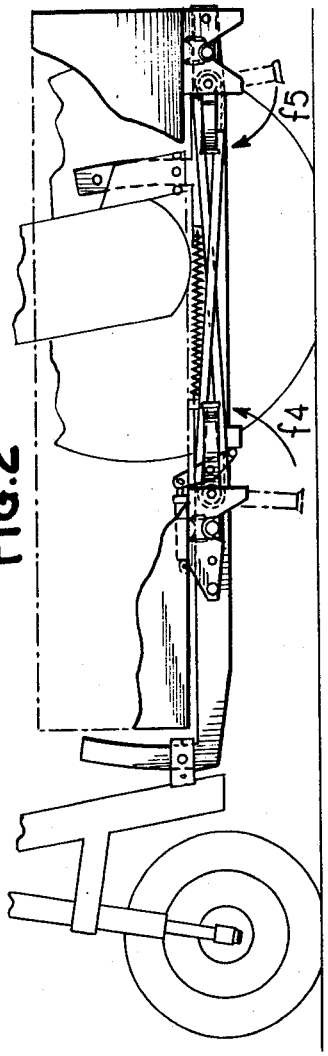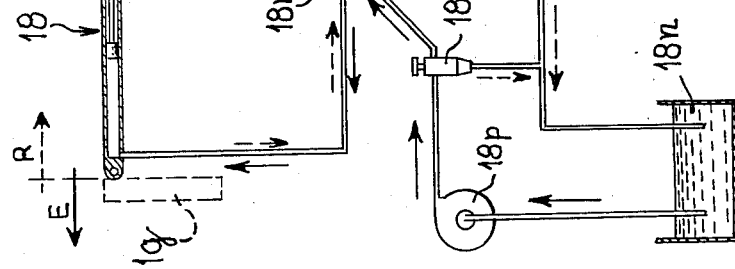

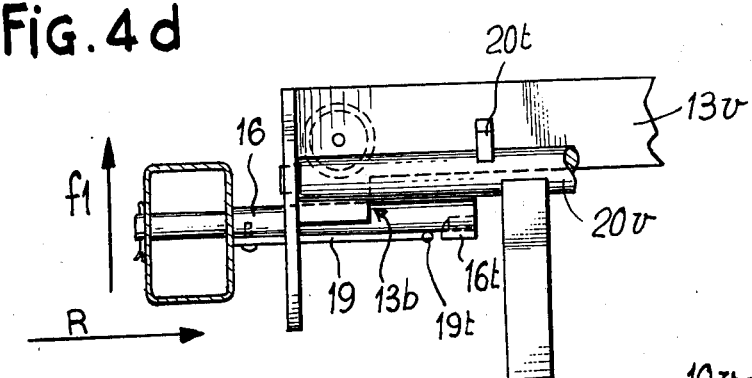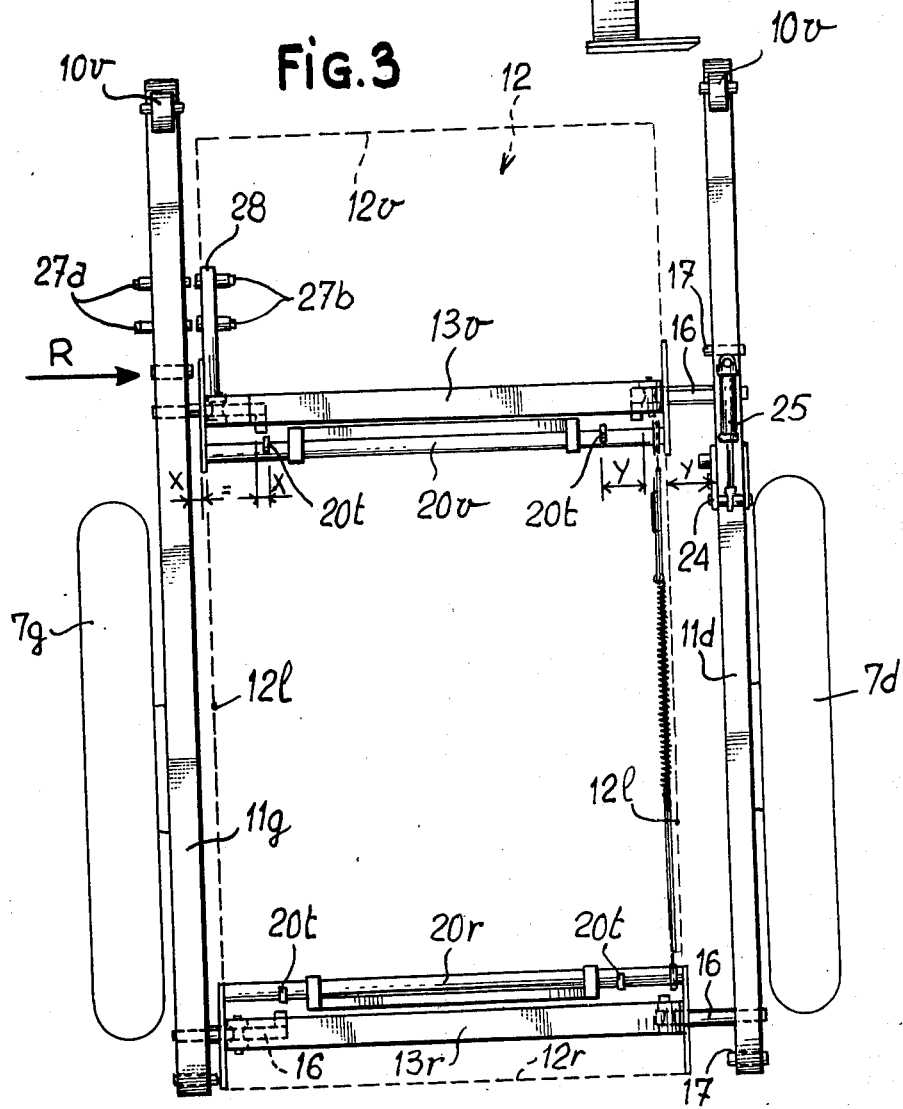

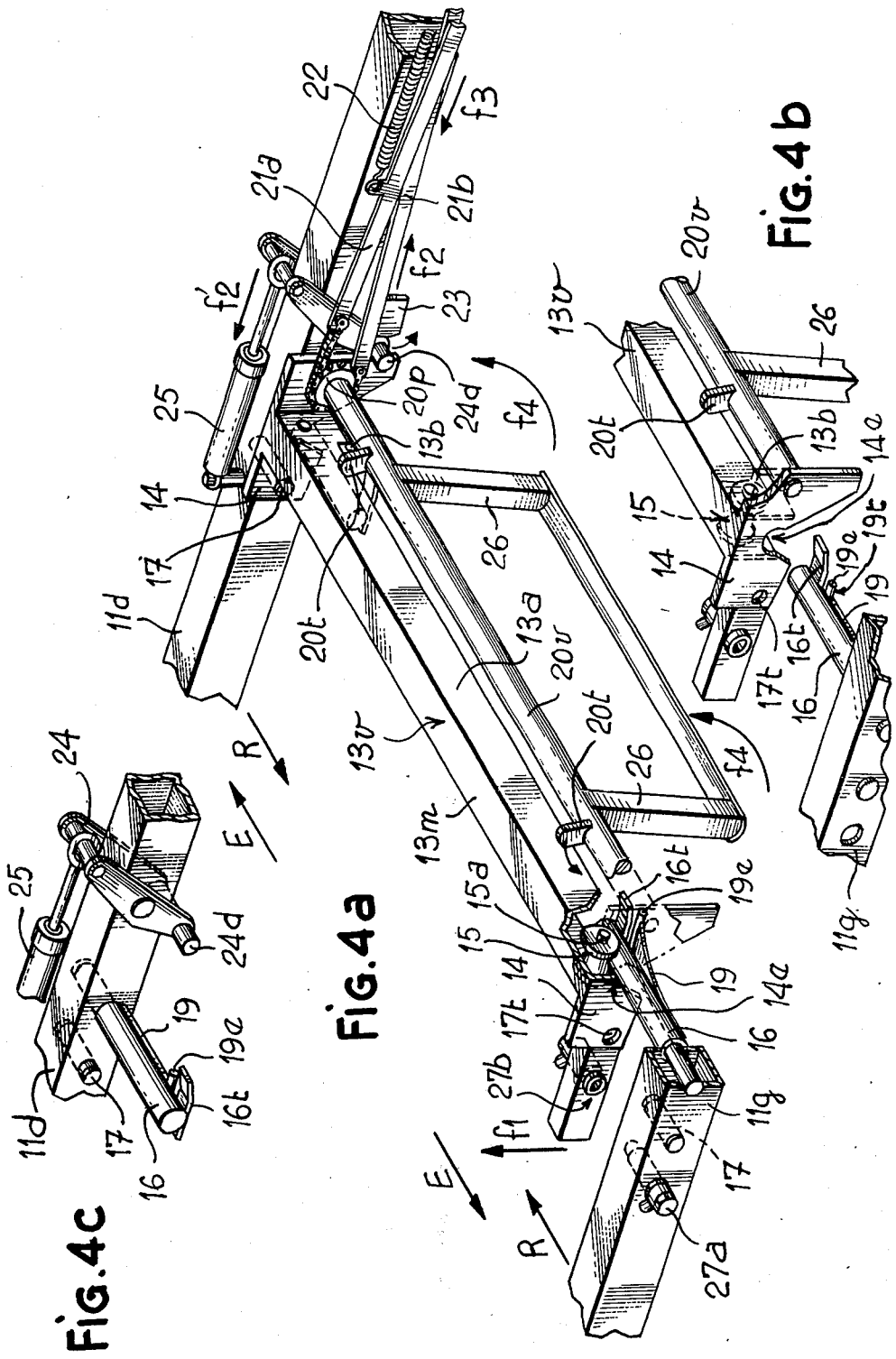

COUPLING MEANS FOR TRACTORS

The invention relates to improved means for coupling by gravity, applicable to an automotive vehicle having a straddle chassis and wheel-tracks which are adjustable while the vehicle is in motion, and to a piece of equipment, the coupling means being of the transverse pin and slot type.

In French Certificate of First Addition No. 93,069 dated Mar. 6, 1967, to Pat. No. 1,448,089 dated May 14, 1965, in particular, it has already been proposed to make use of coupling systems consisting of a male and a female elements, for example a transverse pin and a lateral slot, the elements being designed to cooperate with each other, and being located respectively on an automotive vehicle and a piece of equipment for the purpose of fastening the latter to the vehicle.

The above French patent describes, on the one hand, a straddle-chassis tractor consisting of two vertically mobile longitudinal members equipped with male elements, for example, and, on the other hand, harvesting machines or pieces of equipment integral with laterally-arranged female elements, making it possible to couple one of these pieces of equipment to the tractor by placing the tractor astride it, and thus to obtain a series of self-propelling machines.

This method coupling, however, requires that a substantial space be left between the sides of the tractor chassis and the sides of the piece of equipment, resulting in a useless and, at times, inconvenient increases in overall dimensions.

Although it has already been suggested, especially in the French patent mentioned above, to provide a straddle tractor with adjustable wheel-tracks for the purpose of adapting, by prior adjustment, the width of the tractor chassis to the width of the piece of equipment, it is obvious that the greater the engagement distance, the faster and the more practical the coupling operation; this relative distance involves an increase in transverse dimensions.

Moreover, couplings of this kind do not eliminate manual operations, for instance those required to complete the fastening of the piece of equipment over and above the fastening obtained merely by gravity.

It is an object of this invention to overcome these disadvantages, and to make it possible to carry out consecutively, on terrains of various kinds, couplings and uncouplings of the kinds mentioned above, but in rapid and practical fashion, eliminating any useless increase in transverse dimensions and automatically providing all of the fastenings required for a self-propelling machine.

The invention relates to improved coupling means of the pin and slot type, respectively arranged transversely and laterally, and suitably mounted on a device or a machine and on mobile elements on a level with a straddle tractor having wheel-tracks adjustable while the tractor is in motion, such as the straddle tractor described in U.S. Patent application Ser. No. 356,482 dated May 2, 1973, now U.S. Pat. No. 3,820,615.

Thus the straddle chassis of a tractor of this kind is equipped with a mechanism adapted to be controlled at will and designed to move the two sides of the chassis towards and away from each other while the tractor is in motion, it being thus possible to adjust the wheel-tracks of this tractor at will, even on very uneven ground.

According to the invention, the coupling means comprise transverse sliding and guide arrangements for the slot in relation to the pin, the latter extending substantially transversely within the straddle chassis of the tractor, and means being provided to halt the chassis-closing mechanism as soon as the reactions applied transversely by the sides of the chassis to the device coupled to the tractor reach a predetermined value.

In a tractor of this kind, it is assumed that when it engages with a machine, the sides of the chassis will be sufficiently far apart to allow for such closing operations, however uneven the ground on which the coupling operation is carried out; and that as soon as the machine has been raised, the sides of the chassis will move together, while the machine is in motion, in order to reduce the width of the chassis according to the width of the machine.

Moreover, locking means of the "bolt and catch" type may be provided on the sides of the tractor and on suitable parts of the device or machine coupled thereto, respectively, the dimensions and relative positions of such means being such as to ensure their cooperation at the end of the closing travel of the sides of the tractor.

A machine or device is thus securely and automatically coupled to the tractor, since gravity alone may not be sufficient, in the case of pot-holes in the road, to provide adequate coupling by the pin-and-slot means.

Obviously a lateral latch may be associated with a coupling slot, and the pin for this slot may be arranged to form, at the end of the closing travel, a bolt cooperating with the lateral latch.

As soon as the sides of the tractor have been moved towards each other, provision is made, according to the invention, for transverse bracing of the lower parts of the sides, for the purpose of increasing the mechanical strength of the unit formed by the coupling operation.

The invention also proposes an automatic fluid pipe-line connection between means provided on the coupled equipment and a fluid source suitably located on the tractor.

Finally, the invention proposes means for automatically ensuring, as the sides of the tractor move away from each other for the purpose of uncoupling the machine or piece of equipment, a predetermined minimal distance between each side of the tractor and the coupled machine or piece of equipment.

This distance is obviously necessary to ensure transverse disengagement of the bolt-and-latch locking means and the fluid connecting means in the event of one-sided jamming of the transfer means.

Other characteristics and advantages of the invention may be gathered from the following description in conjunction with the drawings, the description and drawings being given purely by way of non-restrictive example. In the drawings:

FIG. 1 is a longitudinal and vertical section of a straddle tractor having adjustable wheel-tracks, which has just been located, by driving it backwards, over a carrying bucket resting on stands on the ground;

FIG. 2 is similar to FIG. 1 and shows how the bucket may be coupled to the tractor chassis, the stands being raised;

FIG. 3 is a partly broken away plan view of the tractor in FIG. 1, the bucket, shown in dotted lines being coupled asymmetrically to the tractor chassis, the sides of which are not closed;

FIGS. 4a to 4d show, in perspective and partly broken away, the elements which make it possible to couple the bucket to the tractor shown in FIGS. 1 to 3;

FIG. 5 is a diagram of the hydraulic circuit with which the tractor in FIG. 1 is equipped.

FIGS. 1 to 3 show a tractor 1 comprising longitudinal members 2d, and sloping uprights 3d, (elements 2d to 4d an one side of the vehicle being visible in FIG. 1), and cross members 5 and 6.

The longitudinal and cross members are assembled conventionally in the form of two sides (one side 1d shown), provided respectively with driving wheels 7d and steering wheels 8d, the upper parts of these sides being connected together by cross members 5 and 6 to provide a straddle chassis comprising a drive unit consisting of an engine, gearbox, and differential axle, a driver's station, and various accessories (not shown) which are conventionally necessary for the operation of a tractor of this type.

In this connection it is pointed out that a straddle tractor of this type is described in greater detail in the above referenced U.S. Pat. No. 3,820,615, the disclosure of which is herein incorporated by reference; such tractor is suitable for convenient adjustment, while the tractor is in motion, even over uneven ground, of the distance between sides 1d, 1g, and therefore of the wheel-tracks, the sides 1d, 1g comprising means allowing them to slide on cross members 5, 6.

Furthermore, the lower portions of the uprights 3d, 4d (or 3g, 4g) on each side are integral with guide means 9v, 9r for the sliding elements 10v, 10r which, in turn, are integral with the ends of longitudinal members 11d, 11g vertically displaceable by means not shown, the longerons and means of displacement being described in greater detail in French Pat. No. 1,448,089 mentioned above.

A bucket 12, consisting conventionally of a rectangular bottom 12p, two lateral walls 12l, and a front and rear wall 12v, 12r (shown in dotted lines), is secured between the sides of tractor 1.

Two identical profiled elements 13v, 13r, each consisting of a core 13m integral with two wings 13a, are secured transversely, by the cores under bottom 12p, thus forming inverted U-section cross members; one of these cross members is located at the rear end of the bucket behind uprights 4d, 4g, while the other, 13v, is located between the four uprights 3d to 4g of the straddle chassis.

Cross members 13v, 13r are obviously shorter than the maximal possible distance between the sides of the adjustable-wheel-track tractor.

FIGS. 4a to 4c show longitudinal members 11d, 11g and cross member 13v (the bottom of the bucket 12 and the other elements of the tractor chassis being omitted for the sake of clarity).

A rigid plate 14, having a V-shaped slot pointing downwardly, is welded to the end section of cross member 13v (FIGS. 4a, 4b) and is thus located laterally in relation to bucket 12. The bottom of the slot is in the form of an arc of circle, the geometrical axis of which is located within cross member 13v and runs parallel with the core and wings thereof. Moreover, the rear arm of the V is substantially longer than the front arm.

Another plate, identical with plate 14, is welded to the other end of cross member 13v. Two other slotted plates, similar to these two plates 14, are welded to the ends of the other cross member 13r.

A circular-section rod element 15a is located between wings 13a of the cross member, at a short distance from plate 14, at right angles to wings 13a, and suitably attached to the latter.

A roller 15, the dimensions of which match the internal section of cross member 13v, has a throat, the profile of which is similar to that of the bottom of slot 14e in plate 14, the roller being free to rotate on rod 15a; the internal profile of the throat of this roller is located at a slightly lower level than the bottom of slot 14e. The other end of cross member 13v, and the ends of cross member 13r, are also fitted with rollers identical with roller 15.

A relatively long bar 16, of circular cross section and matching the profile of the throat of roller 15, is located at right angles to the lateral surfaces of longitudinal member 11g, the bar being engaged under the slot and roller of cross member 13v, thus forming a unit which projects substantially into the tractor chassis.

Three other bars, similar to bar 16, are secured respectively to the rear end of longitudinal member 11g and to the corresponding parts of longitudinal member 11g, and are thus engaged under the three other rollers 15 of bucket 12.

It will be understood from FIGS. 1 and 2 that bars 16 may cooperate, at the conclusion of an upward movement (arrow f1) of longitudinal members 11d, 11g, with the edges of slots 14e in order to locate bars 16 accurately in relation to rollers 15, the bars 16 and slots 14e constituting, as a result of the load imposed by the bucket, the means for positioning the bucket on tractor 1, as described in the certificate of addition to French Pat. No. 1,448,089.

In addition to this, four relatively short bars 17 are secured perpendicularly to the internal lateral surfaces of longitudinal members 11d, 11g, in the vicinity of each bar 16, in order to form transverse pins, the free ends thereof, projecting into the tractor chassis, being relatively short and being chamfered in order to engage in a hole of suitable size (arrows R).

Furthermore, the parts of lateral plates 14 facing pins 17 are provided with holes 17t for this engagement.

It will be understood that as soon as the bucket has been coupled to tractor 1 by coupling means 14 and 16, as indicated above (FIGS. 2,3), the tractor may be set in motion, and the mechanism for adjusting the distance between the sides thereof may be actuated.

In this connection (FIG. 5), this mechanism may comprise a double-acting hydraulic jack 18, the cylinder and piston rod of which are connected respectively to the two sides 1g, 1d of tractor 1. The two chambers of the said jack are connected to a pressurized-fluid circuit of a conventional nature, comprising a pump 18p, appropriately connected to a power take-off on the tractor engine, the pump drawing fluid from a tank 18n and delivering it under pressure to a known valve device 18r which distributes the fluid, at will, to the first or second chamber of the jack, and returns the fluid from the first of second chamber of the jack to the aid tank, thus causing the sides of tractor 1 to move towards each other (arrows E) or away from each other (arrows R).

It is desirable for the feed-line to distributor 18r to be fitted with a valve 18s which makes it possible to limit to a predetermined value the pressure of the hydraulic fluid within the chambers of jack 18; the valve 18s may be fitted with the usual means for adjusting the pressure above which the mechanism no longer operates.

It will thus be understood (FIGS. 2 and 3) that when sides 1g, 1d move towards each other, there will be relative movement between these sides and bucket 12, as a result of rollers 15 running on bars 16, and, at the conclusion of this operation, pins 17 will engage in holes 17t in plates 14 on the bucket or on the tractor. This locks bucket 12 in relation to the tractor chassis, with no risk of damage to the bucket, since the reactions applied transversely by sides 1d, 1g to cross members 13v, 13r may be limited to a suitable value by suitable adjustment of valve 18s.

Furthermore, a relatively flexible flat bar 19, the length and width of which are slightly less, respectively, than the length and diameter of bars 16, is arranged under bar 16 integrally with the longitudinal member 11g corresponding to cross member 13v, the said bar 19 being attached to the said bar 16 by the end adjacent longitudinal member 11g. A rod element 19d, arranged parallel with longitudinal member 11g and being somewhat longer than the width of cross member 13v, is welded "on edge" to the other end of this bar 19, in a manner such that the ends of rod 19t form two lugs 19e (FIG. 4c).

Moreover, the ends of wings 13a of cross member 13v have downward extensions, the internal sections of which form stops 13b (FIGS. 4b,4d).

It should be noted that the dimensions of bar 16, flexible bar 19, and the end sections of cross member 13v are adapted to facilitate free engagement of lugs 19e with stops 13b for predetermined distances between these elements in relation to each other.

Another transverse bar with lugs 19e, identical with the one described above, is located opposite bar 16 of longitudinal member 11d, to cooperate with stop 13b on cross member 13v.

It will thus be understood that resiliently and vertically retractable lugs 19e on one of longitudinal members 11d or 11g will act as hooks to ensure equal and limited spacing between each side of the bucket and the said longitudinal members, should the tractor be located on sloping ground, in order to allow the said bucket to be properly uncoupled.

In all cases, these "hooks" 19e ensure lateral spacing allowing satisfactory disengagement of the bucket. Adjustment of valve 18s automatically prevents any undue stresses on the chassis as soon as sides have been moved away from each other.

A rod 20v, substantially equal in length to cross member 13v, is arranged parallel with and slightly behind the cross member, the ends of the rod being in the form of journals rotating freely in holes in the lateral extensions constituting the rear parts of plates 14 on cross member 13v.

Two flat bars 20t, rigid but short, are welded radially to bar 20t, the distance between one bar 20t and one plate 14 being slightly less than the overhanding length of a bar 16.

Furthermore (FIGS. 4b,4c), a similar element 16t, arranged longitudinally below bar 16, and pointing rearwardly, is welded to the end of bar 16 and is thus located within the chassis and beyond rod 19t constituting lugs 19e.

It should be noted that the other three bars 16 are fitted with elements identical with this element 16t, and that another rod 20r, similar to rod 20v, is also provided with lugs 20t and is arranged in front of cross member 13r, the two ends being journalled in lateral extensions integral with plates 14 on cross member 13r.

Furthermore, two sprockets 20p, identical with each other, are keyed to the ends of rods 20v and 20r respectively and are located in the same vertical plane, the sprockets being equipped with chain elements in order to synchronize the rotation of rods 20v, 20r. The ends of the chain elements are secured to the ends of two bars 21a, 21b respectively.

The two ends of a tension coil spring 22 are hooked, in the usual manner, to suitable parts of bars 21a and 21b, in order to keep lugs 20t on rods 20v, 20r in a predetermined upward position.

A rectangular plate 23 is arranged parallel with the lateral surfaces of longitudinal member 11d and is welded to the lower edge of bar 21b.

Moreover, a lever 24, made of plate elements suitably cut out and braced together, is hinged, at its central area, to longitudinal member 11d by means of a shaft attached transversely thereto.

The upper end of this lever 24 is connected to the piston rod of a jack 25, the cylinder of which is secured to longitudinal member 11d, while the lower end of the lever is fitted with a transverse pin 24d adapted to cooperate with the front edge of plate 23, thus pushing bar 21 in the direction of arrow f2 and causing lugs 20t on rods 20v, 20r to rotate against the restoring force (arrow f3) of spring 22. Jack 25 is appropriately connected to the tractor's source of pressurized fluid.

The foregoing description makes it possible to understand that when bucket 12 is supported by bars 16, and when the sides are moved towards each other as described above, lugs 20t are located opposite the internal lateral surfaces of lugs 16t. Movement of jack 25 assures the cooperation of these four groups of lugs 20t, 16t, and the dimensions of the lugs, and their locations in relation to each other, when sides 1d, 1g have been moved towards bucket 12, ensure engagement, almost without play, between the external lateral surfaces of lugs 16t and the internal lateral surfaces of lugs 20t. As a result of this, longitudinal members 11d, 11g, and thus the lower parts of sides 1d, 1g, are braced by cross members 20v, 20r of the bucket.

Furthermore, four similar tubular elements 26 each have one of their ends welded radially to rods 20v, 20r at a distance from the ends thereof slightly greater than the projecting portions of bars 16, the elements 26 being arranged vertically when lugs 20t are not in engagement with lugs 16t. They are, moreover, long enough to allow the coupling operations mentioned above, bearing in mind the dimensions of the various parts of slots 14e in cross member 13v, and the height of longitudinal members 11d, 11g above the ground in the coupling position. They therefore constitute stands.

It will be noted that in the example shown in FIGS. 1 and 2, the two bars 21a, 21b are crossed, as a result of which rods 20v, 20r rotate simultaneously in opposite directions. Actuation of these rods by means of jack 25 therefore causes the stands to fold up under the bottom of the bucket.

In moving by gravity from the horizontal to the vertical position, stands 26 may themselves disengage bracing lugs 20t.

It will thus be seen that the operations required to couple bucket 12 may be carried out without difficulty, as described hereinafter.

Sides 1d, 1g of the tractor having been moved sufficiently far apart to leave enough play between them and bucket 12, the tractor is driven in reverse until it is located above the bucket which is resting on its stands 26, until at least one of the lifting bars 16, associated with cross member 13v, comes up against the locating edge of corresponding slot 14e on this cross member.

The driver may then actuate the means for lifting longitudinal members 11d, 11g, as a result of which the four bars 16 engage with their respective slots, finally coming into contact with rollers 15 in order to raise the bucket.

The driver may then move the tractor and simultaneously actuate distributor 18r, causing jack 18 to move sides 1d, 1g together (arrows R), until pins 17 enters holes 17t in plates 14; this operation may be carried out without undue stresses, since rollers 15 roll on bars 16.

Jack 25 may then be actuated to bring about simultaneous automatic retraction of stands 26 and engagement between lugs 20t and 16t. The cross bracing resulting from this engagement of the lugs provides reinforcement for the lower part of the tractor chassis.

Bucket 12 may obviously be released from tractor 1 by carrying out the operations mentioned above in reverse sequence.

During this uncoupling operation, lugs 19e ensure a minimal distance between each side 1d, 1g and the relevant lateral wall of bucket 12, to permit the bucket to be released from the tractor regardless of the slope of the ground at the location where this release is carried out, and regardless of the attitude of the tractor in relation to the contours of the ground.

The tractor may then be coupled, as described above, to another piece of equipment or machine suitably provided with coupling means, transverse rolling means, locking means in all directions, bracing lugs, and release lugs similar to those described above.

In the case of a machine comprising means supplied from a source of pressurized fluid, such as source 18p mentioned above, it is obviously possible to provide automatic connection of the relevant pipe lines on the piece of equipment and the tractor. To this end, as indicated in FIG. 4a, all that is required is to fit the male part of a non-return valve 27a to one of longitudinal members 11d, 11g, and to connect the valve in the conventional manner to the pressurized-fluid source on the tractor. The female part 27b of this valve may be fitted on a bracket 28 integral with one of cross members 13v, 13r, in suitable relationship to the male part. The female part also has a shut-off ball and is duly connected to the device on the piece of equipment which is to be supplied with pressurized fluid. At the end of the movement which brings the sides of the tractor together, these two parts cooperate, thus providing a leak-free connection between the tractor and the piece of equipment.

It is to be understood that pieces of equipment or machines of this kind need not necessarily be provided with stands; moreover the means for raising and lowering coupling bars 16d, 16g may be adapted to the shapes and dimensions of the pieces of equipment; such means may be adapted to move the longitudinal members parallel with the ground.

Slots 14e may also have arms of equal length and they may be fitted with small detachable bars acting as stops.

Finally, certain pieces of equipment to be coupled to the tractor may have only one cross member fitted with slots 14e and rollers, the other cross member having only rollers running on flat beds instead of the bars 16.

What is claimed is:

1. An automotive device provided by coupling a piece of equipment to the sides of the chassis of a straddle tractor, the coupling means used being of the transverse-pin and lateral-slot type suitably mounted on the piece of equipment and on vertically adjustable elements on the tractor chassis, said tractor comprising: means for adjusting the distance between its sides while it is in motion, the slot pins projecting transversely into the straddle chassis, the coupling means including transverse sliding arrangements for said pins; means to shut off the straddle-chassis mechanism as soon as the reactions, applied transversely by the sides of the chassis to the piece of equipment coupled to the tractor, reach a predetermined value.

2. An automotive device according to claim 1, characterized in that the sliding arrangements consist of rollers, the profile of which matches the cross section of the transversely-projecting pins.

3. An automotive device according to claim 1, comprising means of the bolt-and-latch type fitted respectively to the piece of equipment and to the side members of the tractor, in order to provide a lock when said sides of the tractor have completed their travel towards each other.

4. An automotive device according to claim 1, wherein the piece of equipment coupled to the tractor comprises a system of lugs to be actuated, after the sides of the tractor have moved towards the piece of equipment, by a single mechanism carried on the tractor, for bracing the side members thereof, thanks mainly to other lugs provided on the tractor chassis.

5. An automotive device according to claim 4, wherein the piece of equipment coupled to the tractor comprises pivotable stands associated with the lugs and adapted to be raised after said lugs have engaged with the means for bracing the sides of the tractor.

6. An automotive device according to claim 1, wherein the tractor chassis, and the piece of equipment coupled thereto, are fitted respectively with means of the hook-and-stop type for ensuring a predetermined distance between each side of the tractor and the piece of equipment coupled thereto.

7. An automotive device according to claim 1, comprising a piece of equipment adapted to be supplied with fluid from a source of fluid carried on the tractor: a means of connecting the fluid pipeline being provided between one of the sides of the tractor and the piece of equipment coupled thereto, said means of connection comprising a leak-proof male and female element.

8. An automotive device according to claim 1, consisting of a tractor including a mechanism of a hydraulic type for moving the sides away from each other; and means for shutting off said mechanism as soon as the reactions of the sides on the piece of equipment reach a predetermined value, said shutting means including a valve.

* * * * *